United States Patent [19]

Carlson et al.

[11] Patent Number: 5,692,200
[45] Date of Patent: Nov. 25, 1997

[54] BRIDGE CIRCUIT FOR PREVENTING DATA INCOHERENCY BY HOLDING OFF PROPAGATION OF DATA TRANSFER COMPLETION INTERRUPTS UNTIL DATA CLEARS THE BRIDGE CIRCUIT

[75] Inventors: Jeff M. Carlson, Cypress; William C. Galloway, Houston, both of Tex.

[73] Assignee: Compaq Computer Corporation, Houston, Tex.

[21] Appl. No.: 543,724

[22] Filed: Oct. 16, 1995

[51] Int. Cl.$^6$ .................................................. G06F 13/00
[52] U.S. Cl. .................................................. 395/735; 395/308
[58] Field of Search .................................. 395/306–309, 395/733–742

[56] References Cited

U.S. PATENT DOCUMENTS

| | | | |
|---|---|---|---|
| 4,864,496 | 9/1989 | Triolo et al. | 395/306 |
| 4,935,894 | 6/1990 | Ternes et al. | 395/309 |
| 5,414,814 | 5/1995 | McKim | 395/281 |
| 5,535,341 | 7/1996 | Shah et al. | 395/306 |
| 5,560,019 | 9/1996 | Narad | 395/733 |

*Primary Examiner*—Jack B. Harvey
*Assistant Examiner*—Sumati Lefkowitz
*Attorney, Agent, or Firm*—Pravel, Hewitt, Kimball & Krieger

[57] ABSTRACT

A bridge circuit for holding off primary interrupts signaling the completion of a block data transfer from a second bus to a system bus until the data has cleared the bridge circuit. The bridge circuit includes an interrupt control circuit for receiving up to seven primary interrupt signals corresponding to seven sets of bus grant-request lines on a second bus. Each bus grant-request set is assigned a data FIFO for synchronizing the transfer of data from the second bus to a system bus. The interrupt control circuit provides an interrupt to the system bus which corresponds to the primary interrupt only after the associated data FIFO is empty, thereby preventing data coherency problems in system memory.

25 Claims, 9 Drawing Sheets

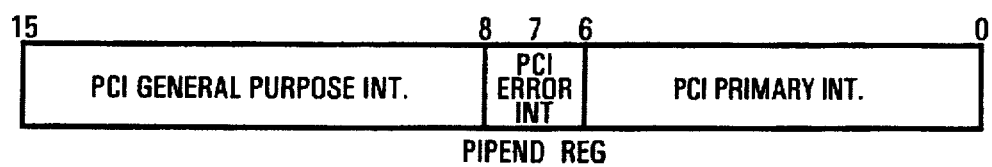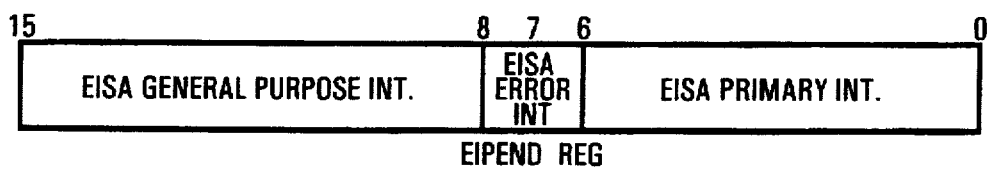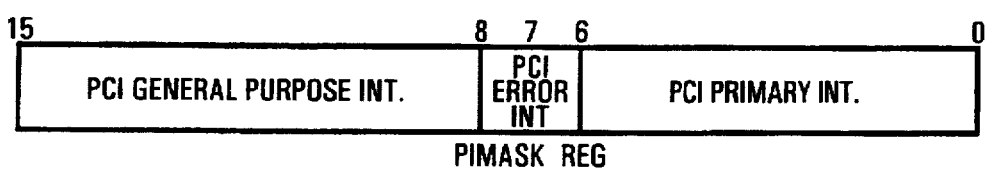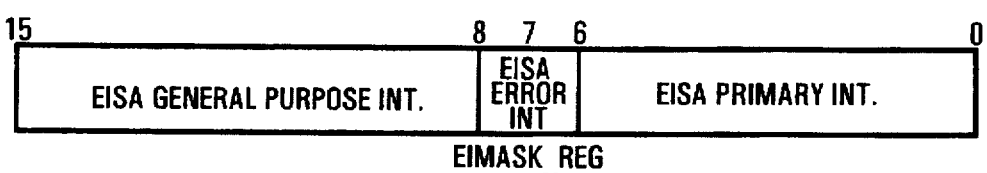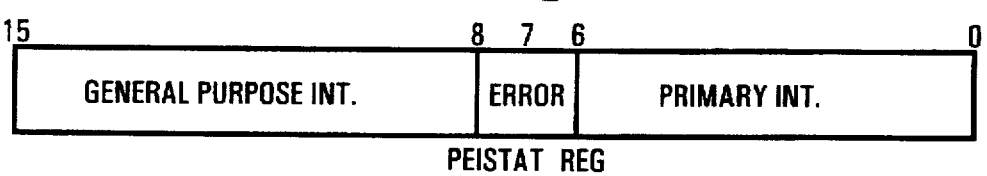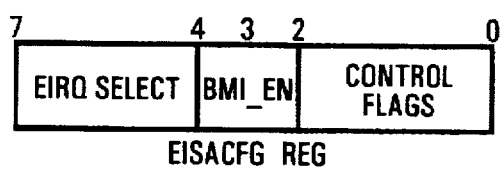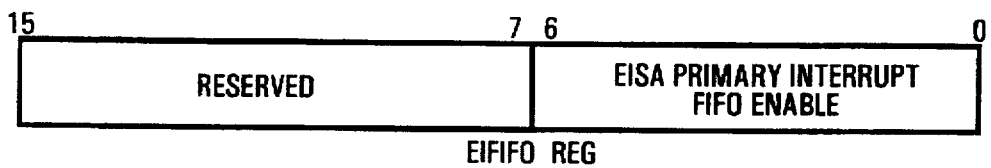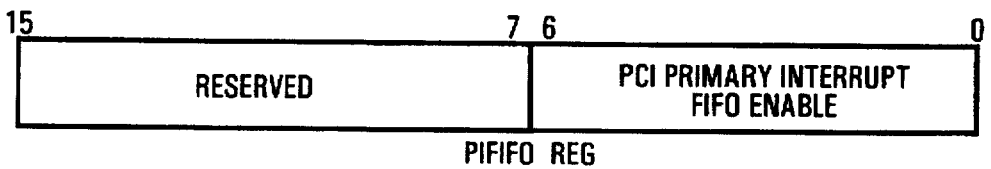
FIG. 5

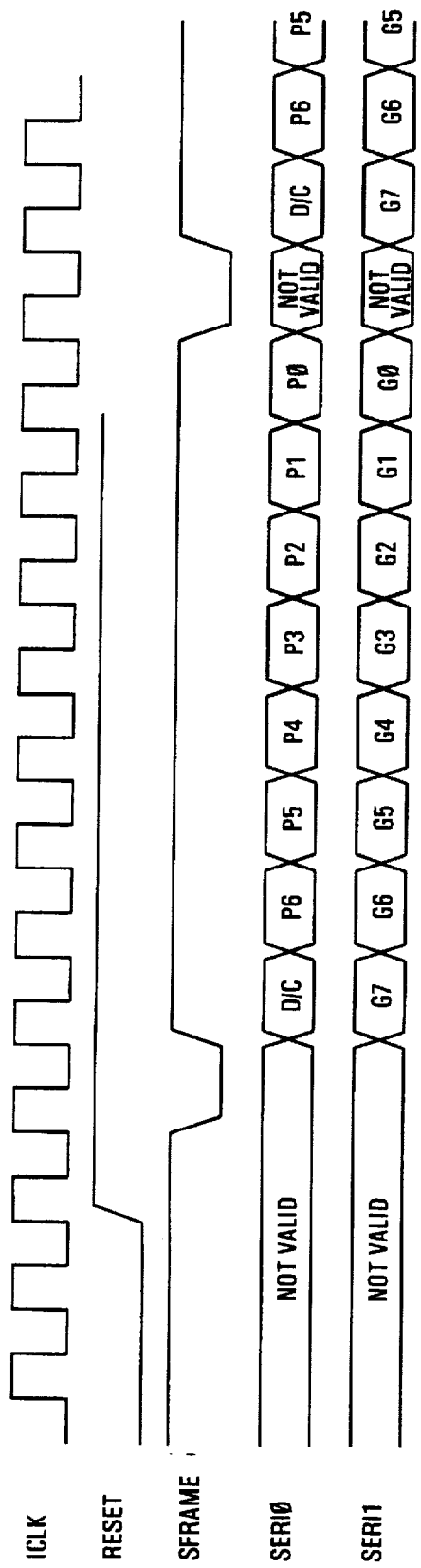
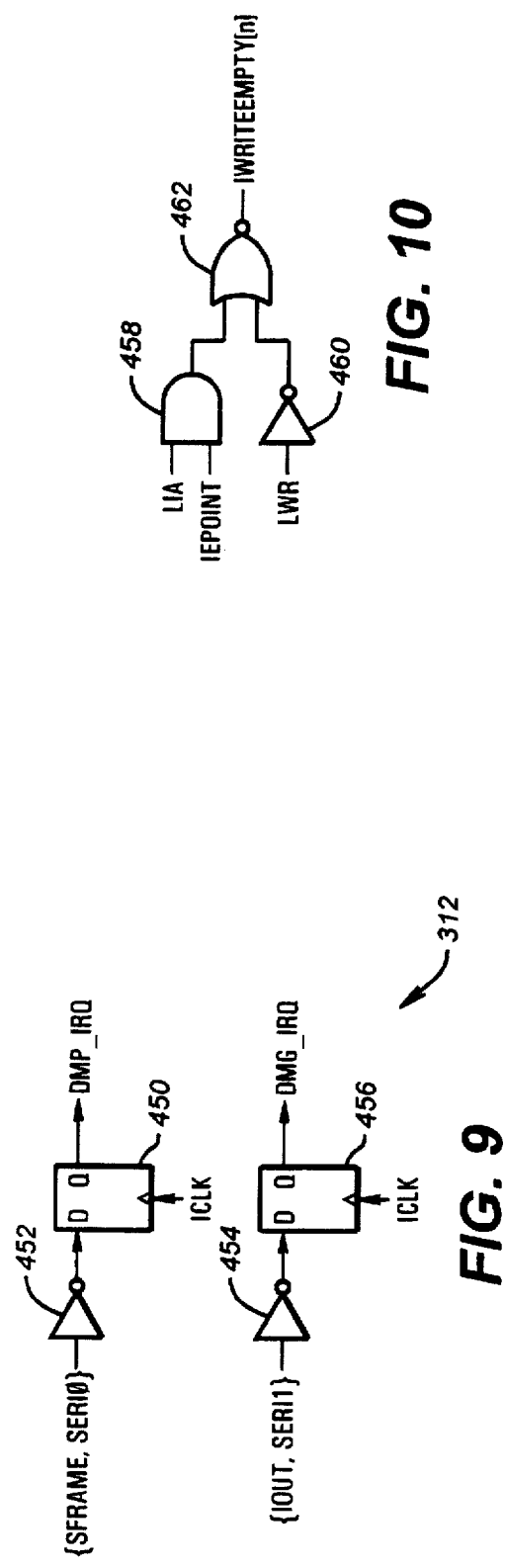

BRIDGE CIRCUIT FOR PREVENTING DATA INCOHERENCY BY HOLDING OFF PROPAGATION OF DATA TRANSFER COMPLETION INTERRUPTS UNTIL DATA CLEARS THE BRIDGE CIRCUIT

BACKGROUND OF THE INVENTION

1. Field of the Invention

The following invention relates to a bridge circuit for interfacing two buses having different architectures and more particularly to an interrupt control circuit of the bridge circuit which holds off interrupts until data clears the bridge circuit.

2. Description of the Related Art

Microprocessors and the personal computers which utilize them have become more powerful over the recent years. Currently available personal computers have capabilities easily exceeding the mainframe computers of 20 to 30 years ago and approach the capabilities of many computers currently manufactured. Microprocessors having word sizes of 32 bits wide are widely available, whereas in the past 8 bits was conventional and 16 bits was common.

Personal computer systems have developed over the years and new uses are being discovered daily. The uses are varied and, as a result, have different requirements for various subsystems forming a complete computer system. Because of production volume requirements and reduced costs as volumes increase, it is desirable that as many common features as possible are combined into high volume units. This has happened in the personal computer area by developing a basic system unit which generally contains a power supply, provisions for physically mounting the various mass storage devices and a system board, which in turn incorporates a microprocessor, microprocessor related circuitry, connectors for receiving circuit boards containing other subsystems, circuitry related to interfacing these circuit boards to the microprocessor, and memory. The use of connectors and interchangeable circuit boards allows subsystems of a desired capability for each computer system to be easily incorporated into the computer system. The use of interchangeable circuit boards necessitated the development of an interface or bus standard so that the subsystems could be easily designed and problems would not result from incompatible decisions by the system unit designers and the interchangeable circuit board designers. Two such system bus standards are an Extended Industry Standard Architecture (EISA) and an Peripheral Component Interconnect (PCI) architecture.

In order to not be confined by the limitations imposed by the system bus, such as the EISA bus, many interchangeable cards may have a higher performance internal bus, such as the PCI bus, the advantages of which are well-known to those skilled in the art. The internal bus of the interchangeable card must be interfaced to the system bus through a bridge circuit. The bridge circuit allows a bus master on the internal bus to access system memory and a bus master on the system bus to access memory space on the interchangeable card. The bridge circuit must be able to decode bus cycles on the internal bus and system bus and generate the corresponding bus cycles on the system bus and internal bus, respectively. Furthermore, the bridge circuit must propagate interrupts appearing on the internal bus to the system bus. One or more data FIFOs are used to synchronize the transfer of data between the two buses.

A data coherency problem exists when the internal bus of the interchangeable card is a higher performance bus than the system bus. When a bus master of the internal bus is transferring a block of data to system memory, the internal bus master may generate an interrupt to indicate the end of the block transfer; however, some of the data may still reside in the bridge circuit's data FIFO. This data may reside in the data FIFO due to the bridge circuit's inability to timely obtain the system bus or possibly just due to the manner in which the data FIFO is serviced by the bridge circuit. The premature appearance of the interrupt on the system bus can lead to a bus master on the system bus accessing invalid data in system memory. Thus, it would be desirable for the bridge circuit to hold off the interrupt signaling the end of the block transfer until the associated data has cleared the data FIFO.

SUMMARY OF THE PRESENT INVENTION

The present invention relates to a bridge circuit for two buses having different architectures. In particular, the present invention relates to a computer system having a system bus and memory and a second bus having one or more bus masters coupled to it. The bridge circuit includes seven data FIFOs, with each data FIFO assigned to a pair of bus grant-request lines of the second bus. The data FIFOs are provided to synchronize the transfer of data between the second bus and the system bus. Furthermore, the bridge circuit includes an interrupt control circuit for holding off primary interrupts to the system bus until data written by the second bus master clears the associated data FIFO.

In the preferred embodiment, the bridge circuit can be configured in either a direct interrupt mode or a serial interrupt mode. In the direct interrupt mode, two pairs of bus grant-request lines on the second bus are assigned to two corresponding data FIFOs. For a write operation, primary interrupts generated by second bus masters are not allowed to pass through to the system bus until the data in the associated data FIFO has cleared the bridge circuit. Furthermore, in the direct interrupt mode, two general purpose interrupts can also be provided to the interrupt control circuit by the second bus, wherein these general purpose interrupts are allowed to pass through to the system bus provided no user interrupt masking.

In the serial interrupt mode, up to fifteen interrupt sources can be provided to the interrupt control circuit from the second bus. In the serial interrupt mode, up to seven primary interrupts, corresponding to seven pairs of bus grant-request lines, can pass from the second bus to the system bus. Each of the primary interrupts is associated with one data FIFO and one bus grant-request pair. As in the direct interrupt mode, the interrupt control circuit will not allow the primary interrupt to pass through to the system bus until the data in the associated FIFO has cleared the bridge circuit. Furthermore, in the serial interrupt mode, up to eight general purpose interrupts can be provided to the interrupt control circuit from the second bus. Provided no user masking of these interrupts, these general purpose interrupts can pass through directly to the system bus from the second bus.

Thus, for a block of data written by a second bus master, the primary interrupt originating on the second bus will not be allowed to propagate through to the system bus, thereby signalling the end of the data transfer, until the data in the corresponding data FIFO is empty. Thus, data coherency problems in system memory are eliminated by delaying the appearance of the primary interrupt signal until the associated data FIFO is empty.

BRIEF DESCRIPTION OF THE DRAWINGS

A better understanding of the present invention can be obtained when the following detailed description of the preferred embodiment is considered in conjunction with the following drawings, in which:

FIG. 5 is a block diagram illustrating the registers of the bridge circuit;

FIG. 8 illustrates the waveforms of the serial interrupt mode;

FIG. 9 is a logic diagram illustrating the generation of the primary interrupt and general interrupt signals by the input circuit of FIG. 4;

FIG. 10 is a logic diagram illustrating the generation of the FIFO empty status flags for the data FIFOs of FIG. 3;

DETAILED DESCRIPTION OF THE PREFERRED EMBODIMENT

Figure 1:
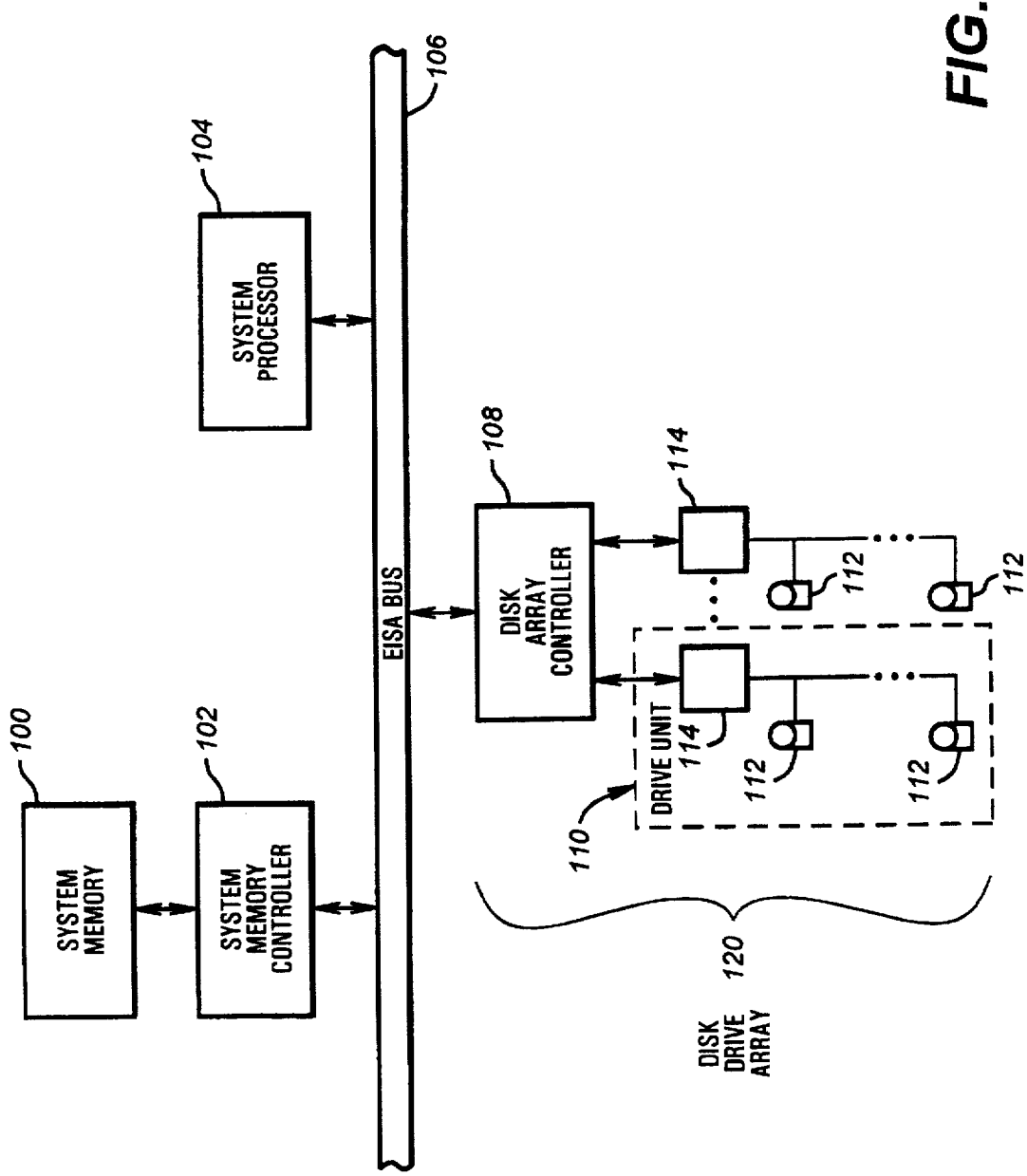
FIG. 1 is a block diagram illustrating the computer system incorporating the present invention.

Shown in FIG. 1 is a computer system utilizing the preferred embodiment of the present invention. Shown in FIG. 1 is a system processor 104 which has its control, address and data lines interfaced to an Extended Industry Standard Architecture (EISA) bus 106. Also interfaced to EISA bus 106 is a system memory controller 102 which interfaces a system memory 100 to EISA bus 106.

Also shown in FIG. 1 is a disk drive array 120. Drive array 120 includes a disk array controller 108 which can function as a bus master, thereby transferring blocks of data to or from system memory 100. Disk array controller 108 has several drive units 110 interfaced to it. Each drive unit 110 has a SCSI bus controller 114. Each SCSI bus controller 114 may have up to seven physical drives 112 connected to it through a SCSI bus.

Drive array 120 is configured as a Redundant Array of Inexpensive Disks (RAID). Drive array 120, by transferring data to drives units 110 in parallel, allows for a much faster transfer rate than for a single drive having the same storage capacity. The physical drives 112 which comprise drive array 120 are transparent to system processor 104. Instead of generating physical commands for each drive 112, system processor 104 submits logical command lists to drive array 120. These logical command lists are for operations to be performed upon logical volumes which may use one or more drives 112. Disk array controller 108 converts the logical command list into a series of physical commands in order to distribute, and retrieve data from drives 112. A more detailed description of the operation of drive array 120 can be found in U.S. patent application Ser. No. 08/543,011, entitled "Read Checking for Drive Rebuild," and U.S. patent application Ser. No. 08/542,800, entitled "User Selectable Priority for Disk Array Background Operations," both of which were filed on Oct. 13, 1995 and are hereby incorporated by reference.

Figure 2:
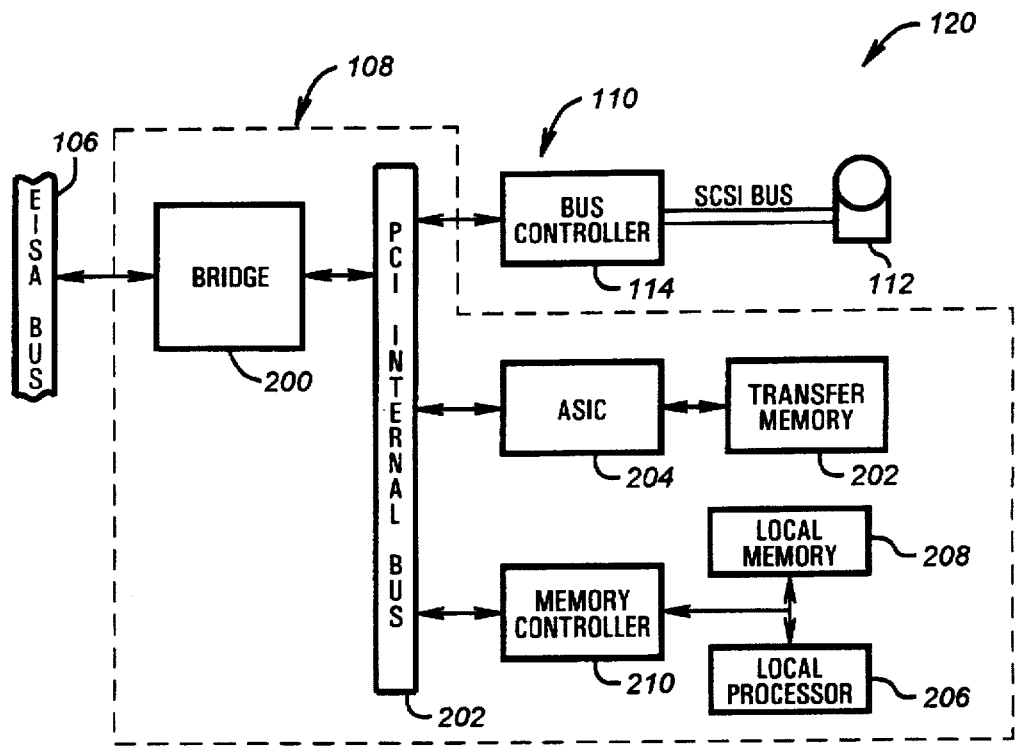
FIG. 2 is a block diagram illustrating the disk drive array of FIG. 1.

Now referring to FIG. 2, shown in FIG. 2 is a more detailed schematic diagram of disk array controller 108. Disk array controller 108 has an internal Peripheral Component Interconnect (PCI) bus 202. Disk array controller 108 also has a local processor 206 which is interfaced to a local memory 208 which includes a random access memory (RAM) and a read only memory (ROM). Local processor 206 is interfaced to PCI bus 202 through a memory controller 210. Memory controller 210 can function both as a slave device and as a bus master and direct memory access (DMA) controller, programmed by system processor 104, to retrieve logical command lists from system memory 100. System processor 104 submits the logical command list to local processor 206 through memory controller 210. Also shown in FIG. 2 is an Application Specific Integrated Circuit (ASIC) 204. ASIC 204 is coupled to PCI bus 202. Also coupled to ASIC 204 is a transfer memory 202. Transfer memory 202 is utilized to post writes to the drive array 120, perform a hardware XOR for parity operations, and serve as a buffer for rebuild operations. ASIC 204 can function as a DMA controller which is programmed by local processor 206. ASIC 204 can transfer data from transfer memory 202 to system memory 100, and ASIC 204 can transfer data from system memory 100 to transfer memory 202. Also shown in FIG. 2 is a SCSI bus controller 114 of a drive unit 110. Each SCSI bus controller 114 can function as a bus master, thereby transferring data to or from drives 112 to system memory 100.

Figure 3:
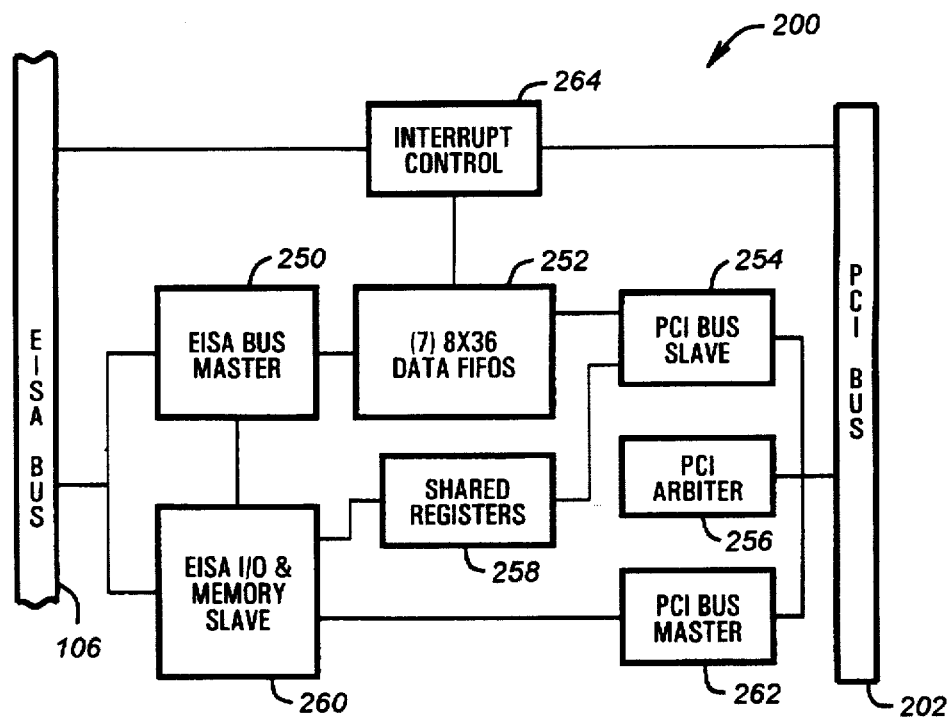
FIG. 3 is a block diagram illustrating the bridge circuit of FIG. 2.

Also shown in FIG. 2 is a bridge circuit 200 coupled between EISA bus 106 and PCI bus 202. Bridge circuit 200 interfaces EISA bus 106 and PCI bus 202. Now referring to FIG. 3, shown in FIG. 3 is a more detailed block diagram of bridge circuit 200. EISA bus master 250 is coupled between EISA bus 106 and seven data FIFOs 252. EISA bus master 250 generates the necessary EISA bus cycles to transfer or retrieve data from or to data FIFOs 252. Data FIFOs 252 synchronize the transfer of data between PCI bus 202 and EISA bus 106. Each data FIFO 252 is eight D words deep, and each D word is 36 bits wide which includes 32 bits of data and four bits with byte enable information. Furthermore, each data FIFO 252 is bi-directional, whereby one side can be clocked at one frequency and the other side can be clocked a different frequency. Each data FIFO 252 is assigned to a set of bus master grant-request lines on PCI bus 202. Data from one data FIFO 252 can be written from one side and read from the other side simultaneously.

Also shown in FIG. 3 is a PCI bus slave 254 which is coupled between data FIFOs 252 and PCI bus 202. In order for a PCI bus master to write or read from system memory 100, the PCI bus master must read from or write to bus slave 254 which functions as a slave port for data FIFOs 252. Disk controller 114, ASIC 204 and memory controller 210 can all become the PCI bus master. Bus slave 254 decodes the PCI bus cycles, and EISA bus master 250 generates the appropriate EISA bus cycles to complete the transfer of data. Thus, whenever the PCI bus master writes to system memory 100, data will flow through PCI bus slave 254, one data FIFO 252 assigned to the corresponding bus grant-request pair and EISA bus master 250.

Also shown in FIG. 3 is an EISA I/O and memory slave 260. Memory slave 260 is interfaced to EISA bus 106. Memory slave 260 is written to or read from by an EISA bus master whenever the EISA bus master is accessing drive array 120. Memory slave 260 decodes the EISA bus cycles. Memory slave 260 is also coupled to a PCI bus master 262. PCI bus master 262 is also interfaced to PCI bus 202. PCI bus master 262 generates the appropriate PCI bus cycles to receive or transfer data from or to PCI bus 202. Note that for transfers by the EISA bus master, there is no data FIFO between memory slave 260 and bus master 262.

Also shown in FIG. 3 is an interrupt control circuit 264 which is coupled between PCI bus 202 and EISA bus 106. When the PCI bus master writes a block of data to system memory 100, the PCI bus master will generate a primary interrupt signaling completion of the transfer of data once the data has been transferred to the corresponding data FIFO. There can be up to seven primary interrupts, P_IRQ0-P_IRQ6, and each of these interrupts are exclusively associated with one data FIFO 252 and one bus grant-request set of PCI bus 202. If programmed by host software, as explained below, interrupt control circuit 264 will hold off the primary interrupt from appearing on EISA bus 106 until the data has cleared the corresponding FIFO 252. Thus, data coherency in system memory 100 is preserved. Interrupt control circuit 264, absent masking programmed by host software, does not hold off general purpose interrupts from propagating through to EISA bus 102. There can be up to eight general purpose interrupts, G_IRQ0-G_IRQ7. As explained in more detail below, interrupt control circuit 264 receives interrupts from PCI bus 202 either directly or in a serial fashion.

PCI bus slave 254 and memory slave 260 are both interfaced to shared registers 258. Bridge circuit 200 also includes a PCI arbiter 256 which is interfaced to PCI bus 202. PCI arbiter assigns the highest priority to bus master 262, next priority goes to local processor 206, and the priority for remaining PCI bus masters is on a first come, first serve basis. Data FIFOs 252 provide read ahead capability for read operations from system memory 100 by the PCI bus master. A more detailed discussion of the operation of bridge circuit 200 not pertaining to interrupt control circuit 264 can be found in U.S. patent application Ser. No. 08/542,882, entitled "Apparatus and Method for Bridging Two Buses Together," filed on Oct. 13, 1995, and U.S. patent application Ser. No. 08/542,820, entitled "Bridge Having a Data Buffer for Each Bus Master," filed on Oct. 13, 1995, which are hereby incorporated by reference.

When the PCI bus master completes a block transfer from or to system memory 100, the PCI bus master will typically generate an interrupt signal, thereby signaling completion of the transfer. In the case of write operations to system memory 100, the present invention relates to preventing interrupts generated by the PCI bus master from propagating to EISA bus 106 until data written by the PCI bus master has cleared data FIFOs 252. Bridge circuit 200 has two different configurations for receiving external interrupt information from PCI bus 202. These two configurations are referred to as a direct interrupt mode and a serial interrupt mode. Bridge circuit 200 can be configured for either mode of operation. At reset, bridge circuit 200 samples EISA data signal ED22 to determine the interrupt mode of operation. An interrupt mode flag, SIMODE, indicates the mode of operation.

In the serial interrupt mode, up to fifteen external interrupting sources can be input to bridge circuit 200 from PCI bus 202. These interrupt signals consist of seven primary interrupt signals, denoted P_IRQ0-P_IRQ6, and eight general interrupt signals, denoted G_IRQ0-G_IRQ7. Each primary interrupt signal is assigned to a bus grant-request set on PCI bus 202. Thus, the primary interrupt signals, P_IRQ0-P_IRQ6 are used by PCI bus masters to signal when the PCI bus master has transferred a block of data to of from system memory 100.

In the direct interrupt mode, up to four external interrupting sources can be provided to bridge circuit 200 from PCI bus 202: two primary interrupts and two general purpose interrupts. The two primary interrupts are associated with two bus grant-request sets on PCI bus 202 and two data FIFOs 252.

Figure 4:
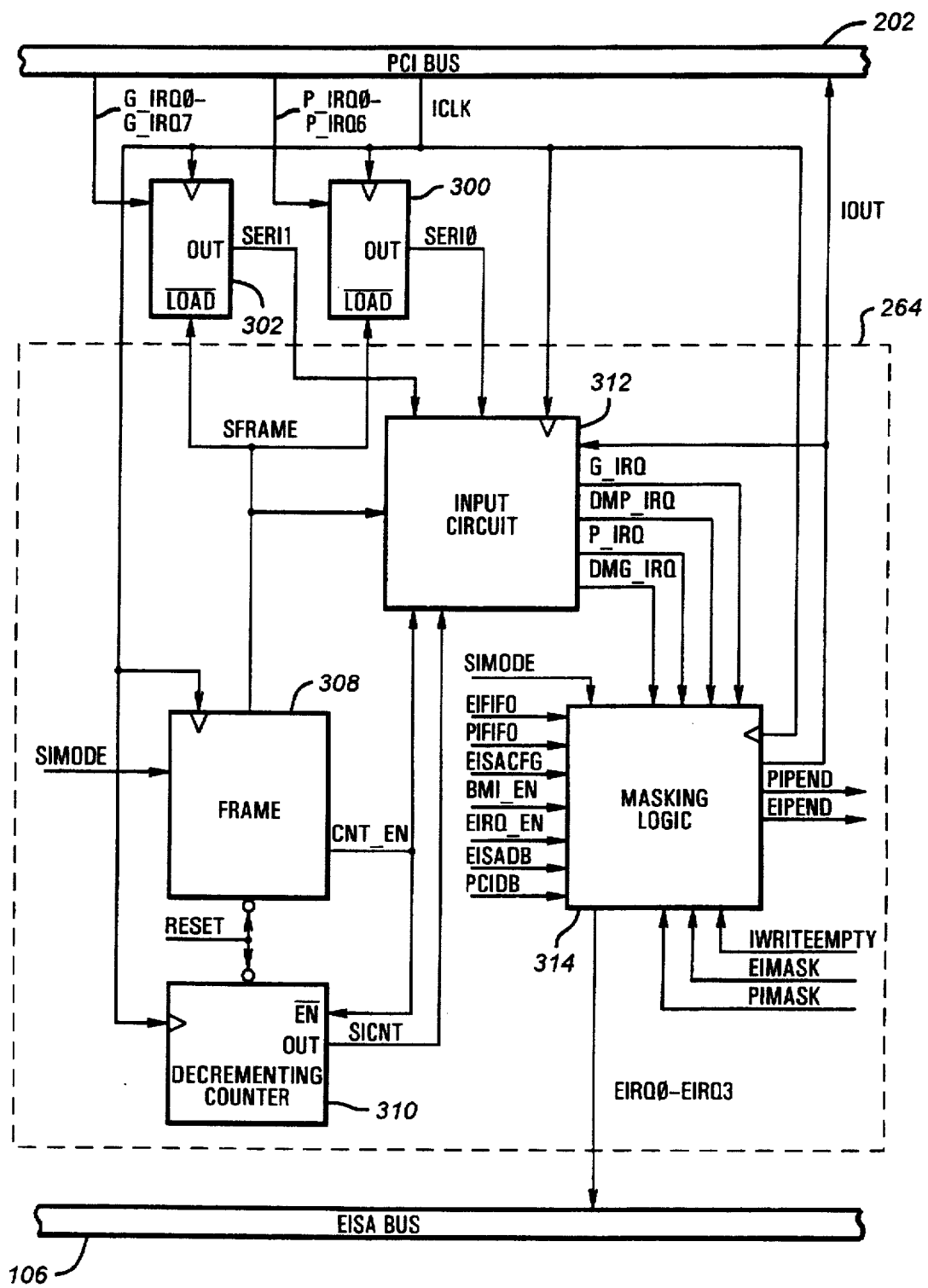
FIG. 4 is a block diagram illustrating the interrupt control circuit of FIG. 3.

FIG. 4 is a block diagram illustrating interrupt control circuit 264. Now referring to FIG. 4, bridge circuit 200 can be configured to operate either in a direct interrupt mode or a serial interrupt mode. The configuration shown in FIG. 4 is for the serial interrupt mode. In the serial interrupt mode, interrupts from PCI bus 202 are received serially and presented to interrupt control circuit 264, wherein primary interrupts, P_IRQ0-P_IRQ6 are provided by a serial data signal, SERI0. General purposes interrupts, G_IRQ0-G_IRQ7 are presented to interrupt control circuit 264 through a serial data signal, SERI1. If bridge circuit 200 is configured to operate in the serial interrupt mode, external circuitry must be added to serialize the interrupts originating from PCI bus 202. This external hardware, as shown in FIG. 4, consists of a shift register 300 and a shift register 302. Shift register 300 provides SERI0, and shift register 302 provides SERI1. Both shift registers 302 and 300 are clocked by a PCI clock signal, ICLK. The inputs to shift register 302 are the general purpose interrupts, G_IRQ0-G_IRQ7. The inputs to shift register 300 are the primary interrupts P_IRQ0-P_IRQ6. Both shift registers 300 and 302 are parallel loaded when a data framing signal, SFRAME, connected to their load inputs is negated. Once the PCI interrupts have been loaded into shift registers 302 and 300, the serial stream of data provided by shift registers 300 and 302 will begin on the positive slope edge of SFRAME.

Shown in FIG. 4 is an input circuit 312. In the serial input mode, input circuit 312 receives SERI1 and SERI0, the two serial interrupt signals. As explained in more detail below, input circuit 312 converts this serial data stream provided by SERI0 and SERI1 into a primary interrupt signal, P_IRQ and a general purpose interrupt signal, G_IRQ. Both P_IRQ and G_IRQ are provided to a masking logic circuit 314. As explained further below, masking logic circuit 314 provides EISA interrupt signals, EIRQ0-EIRQ3. As discussed further below, one of these data signals, as configured by host software, is an EISA interrupt signal for drive array 120. Masking logic circuit 314 also provides a local processor 206 (see FIG. 2) interrupt signal, IOUT, which informs local processor 206 of any primary interrupts originating from PCI bus 202. For a write operation of a block of data by the PCI bus master to system memory 100, masking logic circuit 314 provides the capability to delay any interrupts generated by the PCI bus master until the corresponding data FIFO 252 is empty and the transfer of the block of data to system memory 100 is complete. As explained further below, a data FIFO empty signal, IWRITEEMPTY, provides empty status for data FIFOs 252.

A frame state machine 308 provides the framing for the serial input data, thereby providing SFRAME. Furthermore, frame state machine 308 provides a count enable signal, CNT_EN, and a decrementing counter 310 provides a serial input count signal, SICNT, to input circuit 312. These two signals synchronize the input of serial interrupts as explained further below. Frame state machine 308 also receives the serial input mode signal, SIMODE. The assertion of SIMODE indicates the serial interrupt mode, and the negation of SIMODE indicates the direct interrupt mode. Counter 310 has an enable input for receiving CNT_EN. Counter 310 is enabled when CNT_EN is negated. State machine 308 has as its inputs SIMODE and a RESET signal. RESET is also provided to counter 310. When a system reset occurs, bridge circuit 200 synchronizes the end of system reset with ICLK before enabling state machine 308 and counter 310. The assertion of RESET following the system reset will typically be within 10 periods of ICLK from the trailing edge of system reset. State machine 308 provides the SFRAME signal, and the CNT_EN signal is an enable signal for counter 310. Counter 310 sets SICNT equal to seven on the negative slope edge of RESET.

If SIMODE is negated, thereby indicating the direct interrupt mode for bridge circuit 200, no external circuitry, such as that provided by registers 302 and 300 is needed. For the direct interrupt mode configuration, input circuit 312 receives two primary interrupt signals through SERI0 and SFRAME which function as input signals for the direct interrupt mode. Input circuit 312 receives two general purpose interrupt signals through SERI1 and IOUT. Note that for the direct interrupt mode, SFRAME and IOUT are configured as inputs only.

Shown in FIG. 5 are registers accessible by PCI bus 202 and/or EISA bus 106 as described further below. Now referring to FIG. 5, shown in FIG. 5 is a PIPEND_REG register accessible by PCI bus 202. The contents of PIPEND_REG provide a data signal, PIPEND. This 16 bit read only register indicates the PCI interrupt sources that are driving IOUT. When a one is read in any bit position, it indicates the interrupt source for that bit position is driving the IOUT signal. Bit locations 0–6 indicate which PCI primary interrupt, P_IRQ0–P_IRQ6, respectively, is pending; bit location 7 indicates that a PCI error interrupt is pending; and bit locations 8–15 indicate which PCI general purpose interrupt, G_IRQ0–G_IRQ7, respectively, is pending. In the present invention, the PCI interrupt source will not be reflected in PIPEND_REG until data has cleared the associated data FIFOs 252 in a write operation by the PCI bus master.

EIPEND_REG is an EISA bus accessible 16 bit read only register which indicates the PCI interrupt sources that are driving the selected EISA interrupt output pin: EIRQ0, EIRQ1, EIRQ2 or EIRQ3. When a one is read in any bit position, it indicates that the interrupt source for that bit position is driving the selected EISA interrupt pin. The contents of EIPEND_REG provide a data signal, EIPEND. As shown in FIG. 5, bit location 0–6 indicate which PCI primary interrupt, P_IRQ0–P_IRQ6, respectively, is pending; bit location 7 indicates an EISA error interrupt is pending and bit locations 8–15 indicate which PCI general purpose interrupt G_IRQ0–G_IRQ7, respectively, is pending. In the present invention, the PCI interrupt source will not be reflected in EIPEND_REG until data has cleared FIFOs 252 for a write operation by the PCI bus master.

Also shown in FIG. 5 is a PCI accessible interrupt mask register, PIMASK_REG. This 16 bit read/write register is used to mask PCI interrupt sources from asserting IOUT. A value of one in this register for the corresponding bit position of the interrupt allows that interrupt to drive the IOUT signal. A value of zero disables the interrupt from driving IOUT. Note that if bridge circuit 200 is configured for the direct interrupt mode, IOUT is an input only. The contents of PIMASK_REG provide a data signal, PIMASK.

Also shown in FIG. 5 is an EISA accessible interrupt mask register, EIMASK_REG, which is a 16 bit read/write register used to mask interrupt sources from driving the selected EISA interrupt signal, EIRQ0, EIRQ1, EIRQ2 or EIRQ3. A value of one in this register for the corresponding bit position of the interrupt allows that interrupt to drive the selected EISA interrupt signal. A value of zero disables the interrupt from driving the selected EISA interrupt signal. The contents of EIMASK_REG provide a data signal, EIMASK.

Also, shown in FIG. 5 is an interrupt status register, PEISTAT_REG, which can be accessed from either PCI bus 202 or EISA bus 106. This 16 bit read only register reflects the actual PCI interrupt signals input to bridge circuit 200. Note that PIRQ0, PIRQ1, GIRQ0, GIRQ1 and the PCI/EISA error interrupt are valid in either mode of interrupt operation while PIRQ2–PIRQ6 and GIRQ2–GIRQ6 are only valid when bridge circuit 200 is configured in the serial interrupt input mode. These interrupt status signals are active high, with the value of one indicating an interrupt condition. The contents of PEISTAT_REG provide a signal, PEISTAT.

Shown in FIG. 5 is an EISA configuration register, EISACFG_REG. Bit locations 0–2 are control flags. Bit location 3 is a bus master interrupt enable/disable flag. This flag, when set to 1, disables all interrupts to EISA bus 106 which originate with bridge circuit 200. When cleared, the default case, bridge circuit 200 is enabled to generate EISA interrupts. Bit locations 4–7 are used to direct bridge circuit's 200 EISA interrupts out to EIRQ0, EIRQ1, EIRQ2 or EIRQ3, respectively. When a bit is set, the corresponding interrupt line is selected; however, only one interrupt line can be selected at a time. Bit locations 4–7 provide a signal, ESIACFG.

Also shown in FIG. 5 is an EISA interrupt FIFO enable register EIFIFO_REG. This 16 bit read/write register selects the primary interrupts to be delayed from appearing on EIRQ0, EIRQ1, EIRQ2 or EIRQ3. When an one for an interrupt bit position in this register is programmed and for writes from the PCI bus master, bridge circuit 200 will delay an active unmasked interrupt in the corresponding bit position from being generated until the associated data FIFO 252 is empty. Once generated, the interrupt condition will remain, regardless of subsequent data FIFO status conditions, until the interrupt source is deactivated or unmasked. This register is cleared during reset of bridge circuit 200. Bit locations 0–6 provide a signal, EIFIFO.

Finally, shown in FIG. 5 is a PCI interrupt FIFO enable register, PIFIFO_REG. This 16 bit read/write register selects the PCI interrupt to be delayed from appearing on IOUT until data clears FIFO 252. Similar to the operation of EIFIFO_REG for masking interrupts to EISA bus 106, PIFIFO provides a means for delaying an active unmasked interrupt of the corresponding bit position from being generated until the data FIFO 252 associated with that bit position is empty. Once generated, the interrupt condition will remain, regardless of subsequent data FIFO 252 conditions, until the interrupt source is deactivated or unmasked. This register is cleared during a reset of bridge circuit 200. Bit locations 0–6 provide a data signal, PIFIFO.

Figure 6:
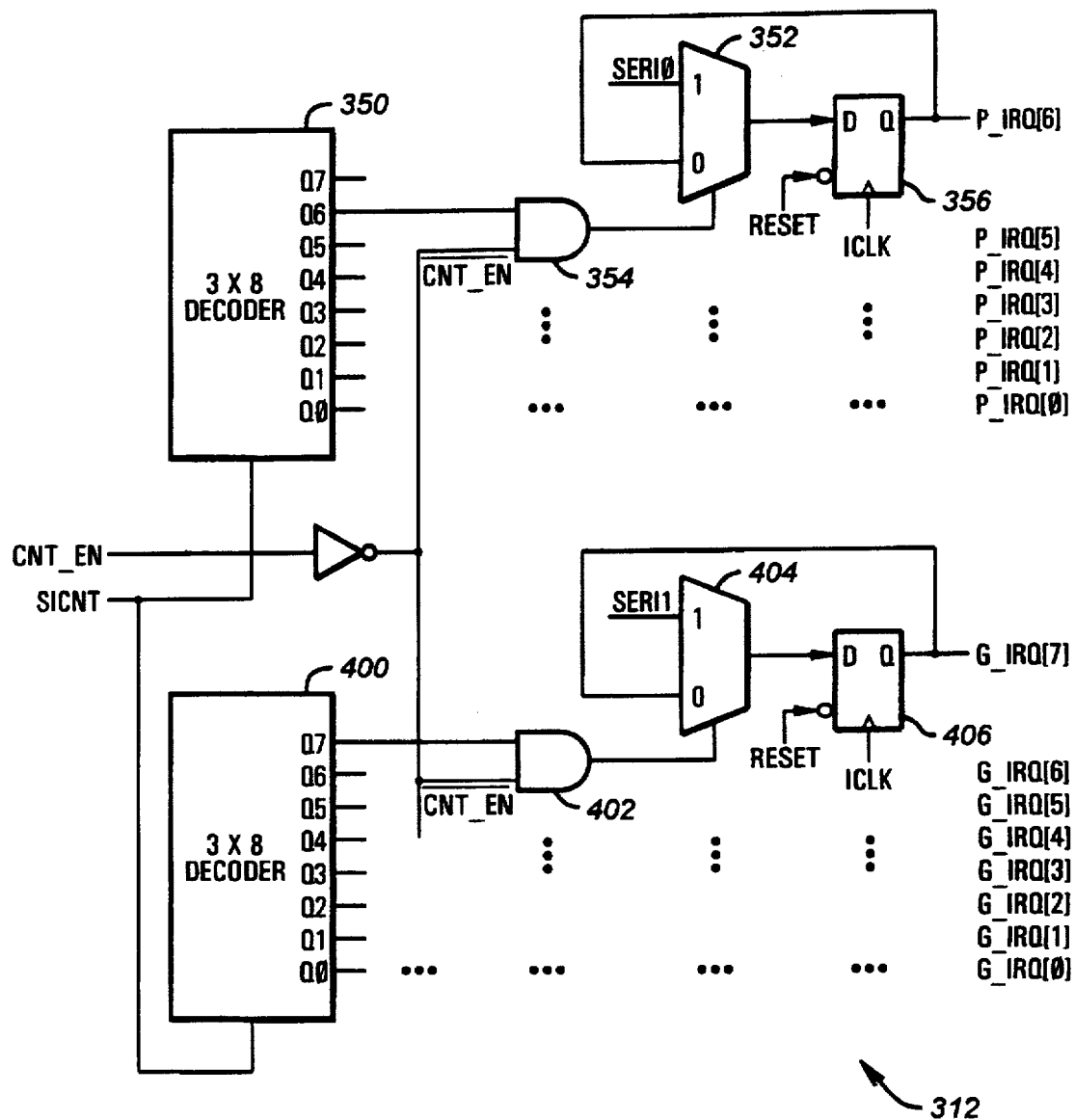
FIG. 6 is a logic diagram illustrating the generation of the primary and general purpose interrupt signals by the input circuit of FIG. 4.
Figure 7:
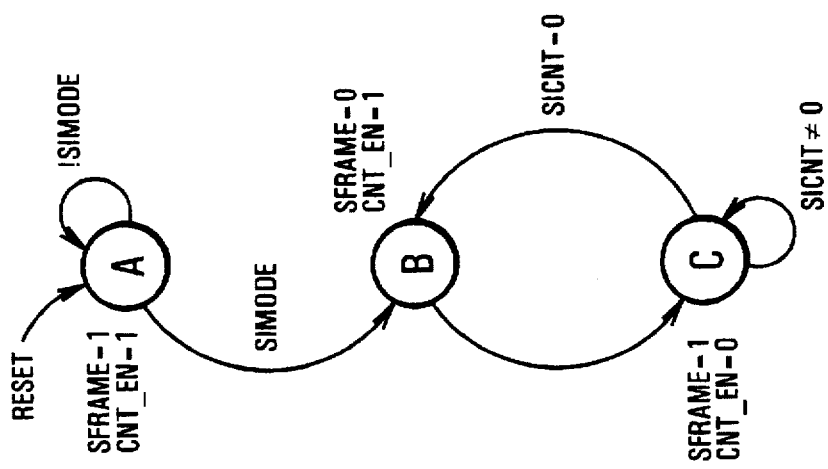
FIG. 7 is a block diagram illustrating operation of the frame state machine of FIG. 4.

FIGS. 6–8 illustrate the hardware for receiving PCI interrupt signals for the serial interrupt mode. Shown in FIG. 6 is a logic diagram illustrating the generation of a 7 bit, primary interrupt signal, P_IRQ, by input circuit 312. The logic of FIG. 6 performs bitwise operations. P_IRQ reflects the interrupt status of the primary interrupt signals PIRQ0–PIRQ6. Shown in FIG. 6 is the generation of one interrupt bit, P_IRQ [6], of P_IRQ. A three bit, serial input count signal, SICNT, is provided to the input of a 3x8 decoder 350. The outputs of decoder 350, Q0-Q6, are employed to select the appropriate timing for interrupt information on SERI0. When a count enable signal, CNT_EN, is low, thereby allowing updates of P_IRQ, SICNT selects the bit location of P_IRQ to be loaded from serial input SERI0. SERI0 provides the stream of serial data corresponding to P_IRQ6-PIRQ0 after the assertion of SFRAME. As shown in FIG. 6, for SICNT equal to six, P_IRQ [6]is equal to SERI0. An AND gate 352, which combines Q6 of decoder 350 and CNT_EN, ensures that P_IRQ [6]will not be updated if CNT_EN is high. The output of AND gate 352 is connected to the select input of a two input multiplexor 354 whose one input is SERI0 and whose zero input is P_IRQ [6]. The output of multiplexor 354 is connected to the D input of a D-type flip-flop 356. Flip-flop 356 is clocked by the PCI clock, ICLK. The output of flip-flop 356 provides P_IRQ [6]. The flip-flop 356 is cleared when RESET is negated. The other bits comprising P_IRQ, P_IRQ [0]-P_IRQ [5], are generated in a similar fashion.

Also shown in FIG. 6 is a logic diagram illustrating the generation of an internal, 8 bit, general purpose interrupt signal, G_IRQ, by input circuit 312. The generation of G_IRQ is similar to the generation of P_IRQ. The generation of one bit of G_IRQ, G_IRQ [7], will be discussed; however, the remaining bits of G_IRQ are generated in a similar fashion. There are eight general purpose interrupt signals, GIRQ0-GIRQ7; therefore, all eight outputs, Q0-Q7, of a 3×8 decoder 400 are used. When SICNT is equal to seven, G_IRQ [7]is then equal to SERI1. An AND gate 402 whose inputs are Q7 and CNT_EN, ensures that G_IRQ [7]will not be updated if CNT_EN is high. The output of AND gate 402 is connected to the select input of a two input multiplexor 404 whose one input is SERI1 and whose zero input is G_IRQ [7]. SERI1 provides the stream of serial data corresponding to G_IRQ7-G_IRQ0 beginning with the assertion of SFRAME. The output of multiplexor 404 is connected to the D input of a D-type flip-flop 406 whose output is G_IRQ [7]. Flip-flop 406 is clocked by the PCI clock, ICLK.

Now referring to FIG. 7, FIG. 7 is a state diagram illustrating operation of frame state machine 308. The state machine transitions on the ICLK signal. On the negative edge of RESET, SICNT is initialized to seven; P_IRQ is set equal to zero; G_IRQ is set equal to zero; DMP_IRQ is set equal to zero; and DMG_IRQ is set equal to zero. Now referring to FIGS. 4, 6 and 7, when SIMODE is zero, bridge circuit 200 is receiving interrupts from PCI bus 202 in the direct interrupt mode. Thus, SFRAME and CNT_EN are high. State machine 308 remains at state A as long as SIMODE is zero. If SIMODE is one, thereby indicating bridge circuit 200 is in the serial interrupt mode, state machine 308 transitions from state A to state B, wherein SFRAME is negated but CNT_EN remains asserted. When SFRAME is negated, shift registers 300 and 302 are loaded with P_IRQ0-P_IRQ6 and G_IRQ0-G_IRQ7, respectively, from PCI bus 202. State machine 308 next transitions from state B to state C on the next ICLK edge. In state C SFRAME is asserted high, thereby allowing shift registers 300 and 302 to serially transmit the serial stream of interrupt data to bridge circuit 200. Furthermore in state C, CNT_EN is negated, thereby allowing counter 310 to begin decrementing SICNT on the next positive edge of ICLK. State machine 308 remains in state C until SICNT is equal to zero. If SICNT is not equal to zero, then counter 310 decrements SICNT by one. Once SICNT is equal to zero, state machine 308 transitions back to state B, where state machine 308 negates SFRAME and asserts CNT_EN, thereby disabling counter 310. Note that counter 310 is allowed to decrement SICNT one more time after SINCT equals zero. Thus, because SICNT is a three bit signal, SICNT is reinitialized to seven.

FIG. 8 illustrates the framing of the serial interrupts input to bridge circuit 200 from PCI bus 202. Now referring to FIG. 8, SFRAME is negated following the rising edge of RESET. As previously noted, RESET corresponds to the reset of state machine 308 and counter 310, not the system reset of bridge circuit 200. After RESET is asserted, SFRAME is negated on the next positive edge of ICLK. SFRAME remains negated for one clock cycle. On the next positive edge of ICLK, shift register 302 provides G_IRQ [7]on SERI0. Note that there is no seventh primary interrupt; therefore, the first serial interrupt input to SERI0 is P_IRQ [6], beginning on the next positive slope of ICLK.

FIG. 9 is a logic diagram illustrating the generation of the direct interrupt mode signals, DMP_IRQ and DMG_IRQ. The logic shown in FIG. 9 performs bitwise operations. Now referring to FIG. 9, DMP_IRQ is formed from SFRAME and SERI0, wherein SFRAME is the most significant bit and SERI0 is the least significant bit. The signal consisting of SFRAME and SERI0 is connected to the input of an inverter 452. The output of inverter 452 is connected to the input of a D-type flip-flop 450 which is clocked by ICLK. The output of flip-flop 450 provides DMP_IRQ. DMG_IRQ is generated in a similar fashion. IOUT provides the most significant bit for DMG_IRQ, and SERI1 provides the least significant bit. The signal consisting of IOUT and SERI1 is connected to the input of an inverter 454. The output of inverter 454 is connected to the input of a D-type flip-flop 456 which is clocked by ICLK. The output of flip-flop 456 provides DMG_IRQ.

Now referring to FIG. 10, shown in FIG. 10 is the logic diagram illustrating the generation of a signal IWRITE-EMPTY. IWRITEEMPTY is a 7 bit signal which indicates the empty status of data FIFOs 252. The bit locations correspond to the status of FIFOs 252. A set bit indicates the corresponding data FIFO 252 is full and a cleared bit indicates the corresponding data FIFO 252 is empty. The logic shown in FIG. 10 performs bitwise operations. FIG. 10 illustrates the generation of one bit of IWRITEEMPTY which corresponds to one data FIFO 252. In particular, FIG. 10 illustrates the generation OF IWRITEEMPTY [n]. A signal LIA corresponds to the contents of a pointer register used by bus slave 254 to address the entries or locations of the associated data FIFO 252, and a signal IEPOINT corresponds to the contents of a pointer register used by EISA bus master 250 to address the entries of the associated data FIFO 252. LIA and IEPOINT are three bit signals, with LIA incremented when data is written to the FIFO 252 and with IEPOINT incremented when data is read from the FIFO 252. Both LIA and IEPOINT are input to an AND gate 458. The output of AND gate 458 is connected to one input of a NOR gate 462. A read/write signal, LWR, is input to an inverter 460. LWR is a latched PCI bus 202 read/write signal. The output of inverter 460 is connected to the other input of NOR gate 462. When LIA equals IEPOINT, this indicates that the associated data FIFO 252 is empty. LWR is asserted for a write operation by the PCI bus master to EISA bus 106, and LWR is negated for a read operation by the PCI bus master. Thus, when the PCI bus master is performing a read operation, LWR is negated and that IWRITEEMPTY [n]will remain negated, thereby ensuring that no primary interrupts from PCI bus 202 will be delayed by bridge circuit 200. However, for a write operation by the PCI bus master to system memory 100, LWRwill be asserted. Thus, in order for IWRITEEMPTY [n]to be negated, LIA will have to be equal to IEPOINT, a condition which indicates that the corresponding data FIFO 252 is empty.

Figure 11A:
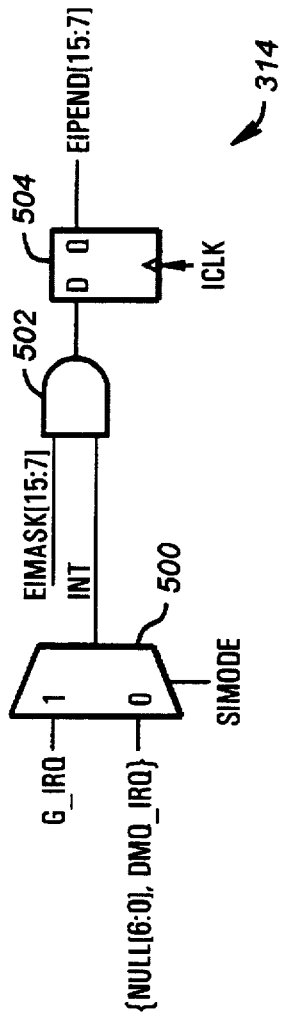
FIGS. 11A and 11b are logic diagrams illustrating the generation of the EISA interrupt pending signal by the masking logic of FIG. 4.
Figure 11B:
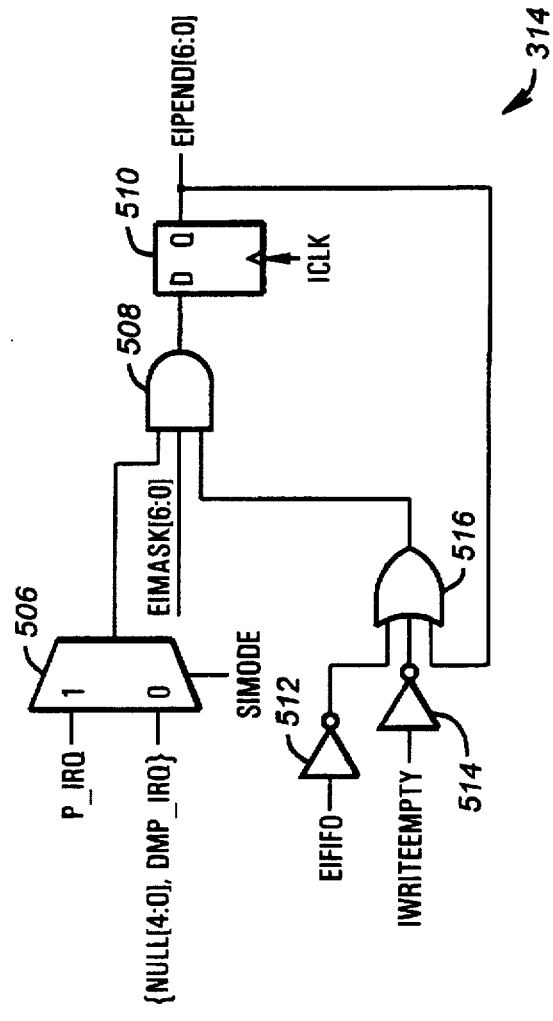

FIGS. 11A and 11b illustrate the generation of EIPEND, the signal which indicates whether any PCI interrupts are pending as generated from PCI bus 202. EIPEND is provided by masking logic 314. The logic of FIGS. 11A and 11b perform bitwise operations. FIG. 11A illustrates the generation of the nine most significant bits of EIPEND, EIPEND [15:7], and FIG. 11B represents the generation of the seven least significant bits of EIPEND, EIPEND [6:0]. EIPEND is the signal representing the contents of EIPEND_REG which can be read from EISA bus 106 to indicate the source of an interrupt originating from PCI bus 202. Now referring to FIG. 11A, a multiplexor 500, whose select input is connected to SIMODE, is used to select the inputs, depending on whether bridge circuit 200 is in the serial interrupt or direct interrupt mode. The output of multiplexor 500 provides a nine bit internal data signal, INT. One input of an AND gate 502 is connected to INT, and the other input of AND gate 502 is connected to the nine most significant bits of EIMASK, EIMASK [15:7]. The output of AND gate 502 is connected to the input of a D-type flip-flop 504 which is clocked by ICLK. The output of flip-flop 504 provides EIPEND [15:7]. The one input to multiplexor 500 is G_IRQ, while the zero input is a nine bit signal having the seven most significant bits as zeros and the two least significant bits as DMQ_IRQ. If SIMODE is high, thereby indicating that bridge circuit 200 is in the serial interrupt mode, then INT equals G_IRQ. If SIMODE is negated, thereby indicating bridge circuit 200 is in the direct interrupt mode, then INT the signal formed from DMQ_IRQ.

The seven least significant bits of EIPEND, EIPEND [6:0], reflect the pending status of the primary interrupts. Thus, if the PCI bus master is writing to system memory 100, these interrupts will be masked until the corresponding data FIFO 252 is empty. Now referring to FIG. 11B, a multiplexor 506 has its select input coupled to SIMODE, thereby selecting the appropriate output for multiplexor 506 depending on whether bridge circuit 200 is in the serial interrupt or direct interrupt mode. Connected to the one input of multiplexor 506 is P_IRQ, while the zero input receives a seven bit signal formed from DMP_IRQ, wherein DMP_IRQ constitutes the two least significant bits of the signal, and the five most significant bits are all zeros. When SIMODE is high, thereby indicating the serial interrupt mode, P_IRQ appears at the output of multiplexor 506. When SIMODE is negated, then the output of multiplexor 506 is a signal formed from DMP_IRQ, wherein the five most significant bits are zeros and DMP_IRQ constitutes the two least significant bits. The output of multiplexor 506 is connected to one input of an AND gate 508. Another input of AND gate 508 is EIMASK. The third input of AND gate 508 is provided by an OR gate 516. One input of OR gate 516 is connected to EIPEND. Another input of OR gate 516 is connected to the output of an inverter 514. A third input of OR gate 516 is connected to the output of an inverter 512. The input of inverter 514 is connected to IWRITEEMPTY. The input of inverter 512 is connected to EIFIFO. Thus, IWRITEEMPTY will prevent an interrupt from appearing in EIPEND [6 . . . 0]until the corresponding data FIFO 252 is empty.

Thus, when any bit of IWRITEEMPTY is one, thereby indicating a nonempty corresponding data FIFO 252, a primary PCI interrupt will not normally appear in EIPEND; however, if EIPEND already indicates an interrupt corresponding to the same bus grant-request set, then the interrupt will remain indicated by EIPEND. As shown in FIG. 11B, EIFIFO selects the PCI bus grant-request sets in which the holding off of interrupts will occur.

Figure 12:
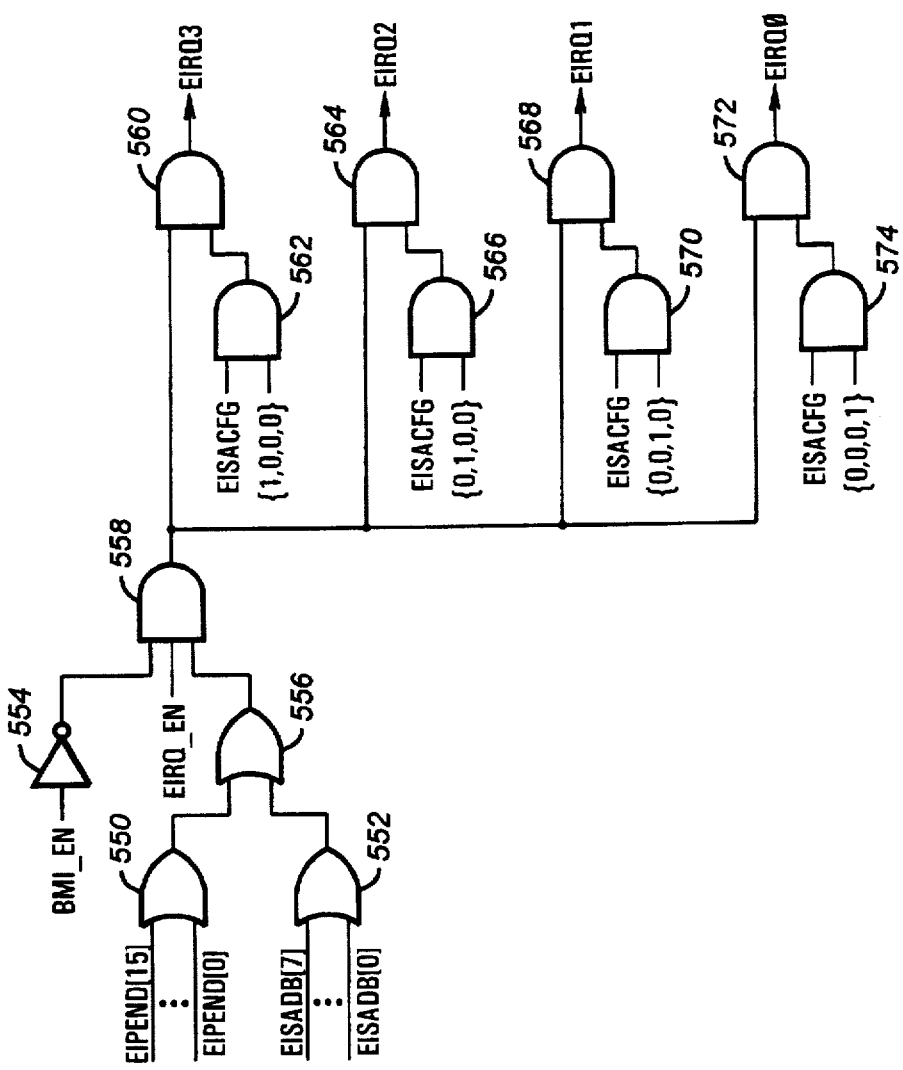
FIG. 12 is a logic diagram illustrating generation of the EISA interrupt signal by the masking logic of FIG. 4.

Now referring to FIG. 12, shown in FIG. 12 is the generation of the EISA interrupt signals, EIRQ0, EIRQ1, EIRQ2 and EIRQ3 by masking logic 314. Some of the logic shown in FIG. 12 performs bitwise operations. As previously discussed, only one of these interrupt signals will be active. Now referring to FIG. 12, an OR gate 550 ORs all bits of EIPEND, EIPEND [15]–EIPEND [0]. Furthermore, an OR gate 552 ORs all bits of EISADB, an EISA doorbell signal. Bridge circuit 200 can generate interrupts corresponding to conditions within bridge circuit 200. The source of these interrupts is reflected in EISADB_PEN, the signal accessible by EISA bus 106 and PCI. Both the output of OR gate 550 and OR gate 552 are connected to separate inputs of an OR gate 556. The output of OR gate 556 is connected to one input of an AND gate 558. Another input of AND gate 558 is connected to an EIRQ_EN signal. EIRQ_EN is an EISA interrupt enable signal. If EIRQ_EN is set, then interrupts from PCI bus 202 are allowed to pass through bridge circuit 200; however, if EIRQ_EN is negated, then no interrupts from PCI bus 202 are allowed to pass through bridge circuit 200. EIRQ_EN is selectable by host software. Also shown in FIG. 12 is a bus master interrupt enable signal, BMI_EN. BMI_EN, when set to one, disables all interrupts generated from bridge circuit 200 to EISA bus 106. BMI_EN is selectable by host software. BMI_EN is connected to the input of an inverter 554, and the output of inverter 554 is connected to the third input of AND gate 558. Thus, the output of AND gate 558 is asserted whenever an interrupt signal is to be propagated to EISA bus 106. The selection of the particular EISA interrupt request line is selected by EISACFG through AND gates 560, 562, 564, 566, 568, 570, 572 and 574. If EISACFG equals eight, then EIRQ3 is the selected interrupt line. If EISACFG is equal to four, then EIRQ2 is the selected interrupt line. If EISACFG is equal to two, then EIRQ1 is the selected interrupt line. Finally, if EISACFG is equal to one, then EIRQ0 is the appropriate interrupt line.

Figure 13A:
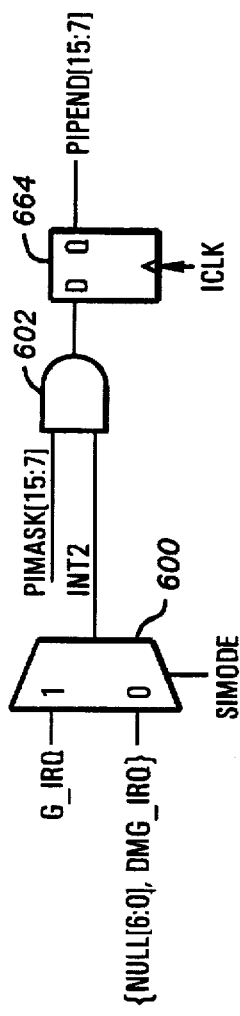
FIGS. 13A and 13B are logic diagrams illustrating the generation of the PCI interrupt pending signal by the masking logic of FIG. 4.
Figure 13B:
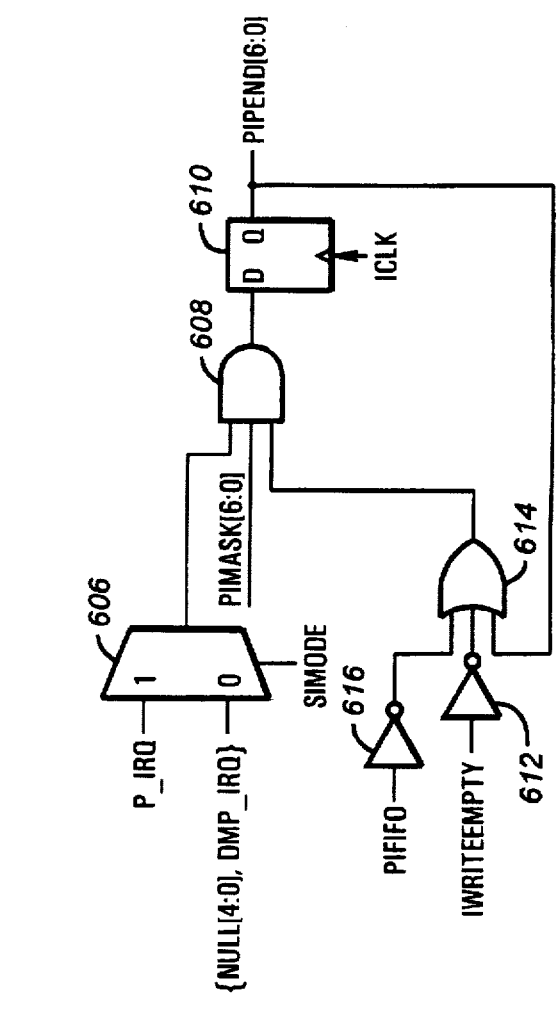

FIGS. 13A and 13B are logic diagrams illustrating the generation of PIPEND, by masking logic 314. The logic shown in FIGS. 13A and 13B perform bitwise operations. The generation of PIPEND is analogous to the generation of EIPEND. As shown in FIG. 13A, a multiplexor 600 has as its select input SIMODE. The one input of multiplexor 600 is G_IRQ and the zero input is a signal including DMG_IRQ with the 6 most significant bits being zero and the two least significant bits being DMG_IRQ. When SIMODE is zero, thereby indicating the direct interrupt mode, INT2, an internal signal provided by multiplexor 600, equals the signal provided by DMG_IRQ. When SIMODE is high, multiplexor 600 selects G_IRQ. Thus, INT2 is equal to G_IRQ. INT2 is one input of an AND gate 602, and the other input of AND gate 602 is the upper nine bits of PIMASK, PIMASK [15:7]. The output of AND gate 602 is provided to the input of a D-type flip-flop 604 which is clocked by ICLK. The output of flip-flop 604 is the nine most significant bits of PIPEND, PIPEND [15:7].

Now referring to FIG. 13B, shown in FIG. 13B is a logic diagram illustrating the generation of the least seven significant bits of PIPEND, PIPEND [6:0]. SIMODE is provided to the select input of a multiplexor 606. The one input of multiplexor 606 is P_IRQ and the zero input is a seven bit signal created from DMP_IRQ, wherein DMP_IRQ is the two least significant bits of the signal and the five most significant bits are zeros. The output of multiplexor 606 is connected to one input of an AND gate 608. Another input of AND gate 608 is the seven least significant bits of PIMASK, PIMASK [6:0]. Another input of AND gate 608 is the output of an OR gate 614. The output of AND gate 608 is connected to the input of a D-type latch 610. The output of latch 610 provides PIPEND. One input of OR gate 614 is connected to the output of an inverter 616. Another input of OR gate 614 is connected to the output of an inverter 612. The third input of OR gate 614 is connected to the seven least significant bits of PIPEND, PIPEND [6:0]. The input of inverter 612 is connected to IWRITEEMPTY, and the input of inverter 616 is connected to PIFIFO. Thus, analogous to the generation of EIPEND [6:0], IWRITEEMPTY and PIFIFO provides a means to hold off a PCI interrupt until data clears the corresponding data FIFO 252.

Figure 14:
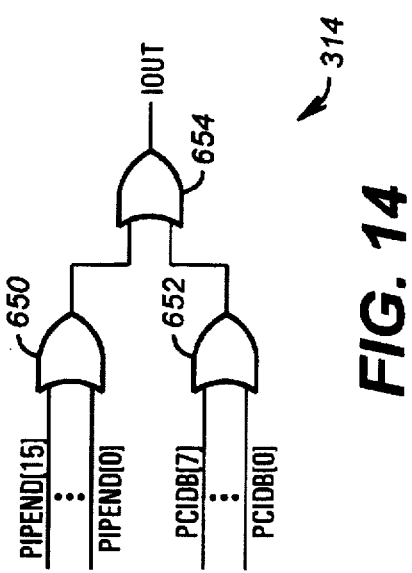
FIG. 14 is a logic diagram illustrating the generation of the interrupt signal to the local processor by the masking logic of FIG. 4.

Shown in FIG. 14 is the generation of IOUT by masking logic 314. As shown in FIG. 14, an OR gate 650 performs a bitwise OR of PIPEND [15]–PIPEND [0]. The output of OR gate 650 is connected to one input of an OR gate 654. An OR gate 652 ORs the bits of the PCI doorbell signal, PCIDB [7]–PCIDB [0]. The output of OR gate 652 is connected to the other input of OR gate 654. The output of OR gate 654 provides IOUT.

In summary, the present invention, provided no user-masking, synchronizes the appearance of primary interrupts, P_IRQ0–P_IRQ6, until the data in the corresponding data FIFO 252 has cleared bridge circuit 200. Input circuit 312 in conjunction with frame state machine 308 and counter 310 allows the serial input of interrupts during the serial interrupt mode. Input circuit 312 also receives interrupts from PCI bus 202 for the direct interrupt mode. Input circuit 312 provides the general and primary interrupts, G_IRQ and P_IRQ, respectively, to masking logic 314. Masking logic 314 prevents any primary interrupts from appearing in EIPEND, EIRQ0-EIRQ3, or IOUT until data was cleared the associated data FIFO 252.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit and scope of the invention.

I claim:

1. A bridge circuit for providing an interface between a first bus and a second bus, wherein the second bus provides a second bus interrupt signal which the bridge circuit provides to the first bus as a first bus interrupt signal, the bridge circuit comprising:

a data FIFO for synchronizing data transfer between the first bus and the second bus, said data FIFO coupled between the first bus and the second bus, wherein said data FIFO provides an empty signal when said data FIFO is empty; and an interrupt control circuit receiving the second bus interrupt signal and said empty signal and providing the first bus interrupt signal to the first bus, the first bus interrupt signal provided when both said second bus interrupt signal and said empty signal are received, the first bus interrupt signal not provided when either said second bus interrupt signal is not received or said empty signal is not received.

2. The bridge circuit of claim 1, wherein said interrupt control circuit continues to provide the first bus interrupt signal as long as the second bus provides the second bus interrupt signal.

3. A bridge circuit for providing an interface between a first bus and a second bus, wherein the second bus provides a plurality of second bus interrupt signals which the bridge circuit provides to the first bus as a first bus interrupt signal, the bridge circuit comprising:

a plurality of data FIFOs for synchronizing data transfer between the first bus and the second bus, each data FIFO coupled between the first bus and the second bus, wherein each data FIFO provides an empty signal when said data FIFO is empty and wherein each data FIFO is associated with one of the plurality of second bus interrupt signals; and an interrupt control circuit receiving the plurality of second bus interrupt signals and said plurality of data FIFO empty signals and providing the first bus interrupt signal to the first bus, the first bus interrupt signal provided when any of the second bus interrupt signals and the associated data FIFO empty signal are received, the first bus interrupt signal not provided when all of said second bus interrupt signals and said associated data FIFO empty signals are not received.

4. The bridge circuit of claim 3, wherein said interrupt control circuit continues to provide the first bus interrupt signal as long as the second bus provides any one of the plurality of second bus interrupt signals and the associated empty signal are received.

5. The bridge circuit of claim 3, further comprising:

an interrupt status register which indicates which of said plurality of second bus interrupt signals are pending, and wherein said interrupt control circuit is connected to said interrupt status register and provides a second bus interrupt pending signal to said interrupt status register for each of said plurality of second bus interrupt signals, said second bus interrupt pending signal indicating a pending interrupt when a respective second bus interrupt signal and the associated data FIFO empty signal are received.

6. The bridge circuit of claim 3, further comprising:

an interrupt mask register for receiving indications as to which of said plurality of second bus interrupt signals is to be masked; and wherein the first bus interrupt signal provided when any of the non-masked second bus interrupt signals and the associated data FIFO empty signal are received said first bus interrupt signal not provided when any of the masked second bus interrupt signals and the associated data FIFO signal are received.

7. The bridge circuit of claim 3, wherein the second bus provides a plurality of general second bus interrupt signals not associated with said plurality of data FIFOs and a plurality of primary second bus interrupt signals associated with said plurality of data FIFOs said interrupt control circuit providing the first bus interrupt signal if any of said plurality of general second bus interrupt signals is asserted.

8. A bridge between a first bus and a second bus, comprising:

a first bus master;

a second bus master;

a bridge circuit for providing an interface between the first bus and the second bus, wherein the second bus provides a second bus interrupt signal which the bridge circuit provides to the first bus as a first bus interrupt signal, the bridge circuit comprising:

a data FIFO for synchronizing data transfer between the first bus and the second bus, said data FIFO coupled between the first bus and the second bus, wherein said data FIFO provides an empty signal when said data FIFO is empty; and an interrupt control circuit receiving the second bus interrupt signal and said empty signal and providing the first bus interrupt signal to the first bus, the first bus interrupt signal provided when both said second bus interrupt signal and said empty signal are received, the first bus interrupt signal not provided when either said second bus interrupt signal is not received or said empty signal is not received.

9. The bridge of claim 8, wherein the first bus master is a processor.

10. The bridge of claim 8, wherein the first bus master is a memory controller.

11. The bridge of claim 8, wherein the first bus master is an Application Specific Integrated Circuit (ASIC).

12. A bridge between a first bus and a second bus, comprising:

a first bus master;

a second bus master;

a bridge circuit for providing an interface between the first bus and the second bus, wherein the second bus provides a plurality of second bus interrupt signals which the bridge circuit provides to the first bus as a first bus interrupt signal, the bridge circuit comprising:

a plurality of data FIFOs for synchronizing data transfer between the first bus and the second bus, each data FIFO coupled between the first bus and the second bus, wherein each data FIFO provides an empty signal when said data FIFO is empty and wherein each data FIFO is associated with one of the plurality of second bus interrupt signals; and an interrupt control circuit receiving the plurality of second bus interrupt signals and said plurality of data FIFO empty signals and providing the first bus interrupt signal and said plurality of data FIFO empty signal and providing the first bus interrupt signal to the first bus, the first bus interrupt signal provided when any of the second bus interrupt signal and the associated data FIFO empty signal are received, the first bus interrupt signal not provided when all of said second bus interrupt signals and said associated data FIFO empty signals are not received.

13. The bridge of claim 12, wherein said interrupt control circuit of said bridge circuit continues to provide the first bus interrupt signal as long as the second bus provides any one of the plurality of second bus interrupt signals and the associated empty signal are received.

14. The bridge of claim 12, further including:

an interrupt status register which indicates which of said plurality of second bus interrupt signals are pending, and wherein said interrupt control circuit is connected to said interrupt status register and provides a second bus interrupt pending signal to said interrupt status register for each of said plurality of second bus interrupt signals, said second bus interrupt pending signal indicating a pending interrupt when a respective second bus interrupt signal and the associated data FIFO empty signal are received.

15. The bridge of claim 12, further including:

an interrupt mask register for receiving indications as to which of said plurality of second bus interrupt signals is to be masked; and wherein the first bus interrupt signal is provided when any of the non-masked second bus interrupt signals and the associated data FIFO empty signal are received, said first bus interrupt signal not provided when any of the masked second bus interrupt signals and the associated data FIFO signal are received.

16. The bridge of claim 12, wherein the second bus provides a plurality of general second bus interrupt signals not associated with said plurality of data FIFOs and a plurality of primary second bus interrupt signals associated with said plurality of data FIFOs, said interrupt control circuit providing the first bus interrupt signal if any of said plurality of general second bus interrupt signals is asserted.

17. A disk array controller for coupling a disk array through an internal first bus of the controller to an external second bus comprising:

a first bus internal to the controller;

a first bus master;

a bridge circuit for providing an interface between the first bus and the second bus, wherein the second bus provides a second bus interrupt signal which the bridge circuit provides to the first bus as a first bus interrupt signal, the bridge circuit comprising:

a data FIFO for synchronizing data transfer between the first bus and the second bus, said data FIFO coupled between the first bus and the second bus, wherein said data FIFO provides an empty signal when said data FIFO is empty; and an interrupt control circuit receiving the second bus interrupt signal and said empty signal and providing the first bus interrupt signal to the first bus, the first bus interrupt signal provided when both said second bus interrupt signal and said empty signal are received, the first bus interrupt signal not provided when either said second bus interrupt signal is not received or said empty signal is not received.

18. The disk array controller of claim 17, wherein the bridge circuit comprises:

a plurality of data FIFOs for synchronizing data transfer between the first bus and the second bus, each data FIFO coupled between the first bus and the second bus, wherein each data FIFO provides an empty signal when said data FIFO is empty and wherein each data FIFO is associated with one of the plurality of second bus interrupt signals.

19. The disk array controller of claim 18, wherein the bridge circuit further comprises:

an interrupt status register which indicates which of said plurality of second bus interrupt signals are pending, and wherein said interrupt control circuit is connected to said interrupt status register and provides second bus interrupt pending signals to said interrupt status register, a second bus interrupt pending signal provided for each of said plurality of second bus interrupt signals, said second bus interrupt pending signals indicating a pending interrupt when a respective second bus interrupt signal and the associated data FIFO empty signal are received.

20. The disk array controller of claim 18, wherein the bridge circuit further comprises:

an interrupt mask register for receiving indications as to which of said plurality of second bus interrupt signals is to be masked; and wherein the first bus interrupt signal is provided when any of the non-masked second bus interrupt signals and the associated data FIFO empty signal are received, said first bus interrupt signal not provided when any of the masked second bus interrupt signals and the associated data FIFO signal are received.

21. The disk array control of claim 18, wherein the bridge circuit second bus provides a plurality of general second bus interrupt signals not associated with said plurality of data FIFOs and a plurality of primary second bus interrupt signals associated with said plurality of data FIFOs, said interrupt control circuit providing the first bus interrupt signal if any of said plurality of general second bus interrupt signals is asserted.

22. A computer system comprising:
   a disk drive array, comprising said disk array controller including:
      an internal first bus;
      a first bus master;
      a second bus internal to said disk array controller;
   said disk array controller further including:
      a bridge circuit for proving an interface between the first bus and the second bus, wherein the second bus provides a second bus interrupt signal which the bridge circuit provides to the first bus as a first bus interrupt signal, the bridge circuit comprising:
         a data FIFO for synchronizing data transfer between the first bus and the second bus, said data FIFO coupled between the first bus and the second bus, wherein said data FIFO provides an empty signal when said data FIFO is empty; and
         an interrupt control circuit receiving the second bus interrupt signal and said empty signal and providing the first bus interrupt signal to the first bus, the first bus interrupt signal provided when both said second bus interrupt signal and said empty signal are received, the first bus interrupt signal not provided with either said second bus interrupt signal is not received or said empty signal is not received.

23. The computer system of claim 22, wherein said bridge circuit of said disk array controller further comprises:
   an interrupt status register which indicates which of said plurality of second bus interrupt signals are pending, and wherein said interrupt control circuit is connected to said interrupt status register and provides a second bus interrupt pending signal for each of said plurality of second bus interrupt signals, said second bus interrupt pending signal indicating a pending interrupt when a respective second bus interrupt signal and the associated data FIFO empty signal are received.

24. The computer system of claim 22, wherein said bridge circuit of said disk array controller further comprises:
   an interrupt mask register for receiving indications which of said plurality of second bus interrupt signals is to be masked; and
   wherein the first bus interrupt signal is provided when any of the non-masked second bus interrupt signals and the associated data FIFO empty signal are received, said first bus interrupt signal not provided when any of the masked second bus interrupt signals and the associated data FIFO signal are received.

25. The computer system of claim 22, wherein the second bus provides a plurality of general second bus interrupt signals not associated with said plurality of data FIFOs and a plurality of primary second bus interrupt signals associated with said plurality of data FIFOs, said interrupt control circuit providing the first bus interrupt signal if any of said plurality of general second bus interrupt signals is asserted.

* * * * *